US007613824B1

(12) United States Patent
Elberse et al.

(10) Patent No.: US 7,613,824 B1
(45) Date of Patent: Nov. 3, 2009

(54) METHOD OF USING A WEB-BROWSER TO PASS INFORMATION FROM A FIRST WEB-ENTITY TO ONE OF A PLURALITY OF SECOND WEB-ENTITIES

(75) Inventors: Arik Elberse, Knocknacarra (IE); Breandan Dalton, Eire (IE); Seamus MacConaonaigh, Eire (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 1984 days.

(21) Appl. No.: 09/707,015

(22) Filed: Nov. 6, 2000

(51) Int. Cl.
*G06F 15/173* (2006.01)
(52) U.S. Cl. .................................................. 709/238
(58) Field of Classification Search ................. 709/226, 709/238
See application file for complete search history.

(56) References Cited

U.S. PATENT DOCUMENTS 5,870,546 A * 2/1999 Kirsch ........................ 709/205
6,070,191 A * 5/2000 Narendran et al. .......... 709/226
6,466,966 B1 * 10/2002 Kirsch et al. ................ 709/203

FOREIGN PATENT DOCUMENTS

EP            0935380 A2     8/1999
WO            WO 99/14951    3/1999
WO            WO 99/60767    11/1999

* cited by examiner

*Primary Examiner*—J Bret Dennison
(74) *Attorney, Agent, or Firm*—Barnes & Thornburg LLP

(57) ABSTRACT

When a user obtains information from a web-based information system this is usually being obtained for a task which then needs to be completed by the user. Often this task involves sending the information onto another device. For example, in the case that the web-based information system is a telephone directory, the task is typically to obtain a person's telephone number and then to make a call to that person. The present invention enables these types of processes to be automated. An additional web server (called a redirection server) is used to receive information from the web-based information system and redirect this information to a required information receiver (such as the user's telephone, video recorder, or other device). In this way the web-based information system does not require knowledge about the information receiver and it is not required to use a special web-browser. In another embodiment, several redirection servers are used in order to improve performance for certain situations, such as where the redirection server is part of a communications network that is private to a particular enterprise.

17 Claims, 5 Drawing Sheets

PRIOR ART

METHOD OF USING A WEB-BROWSER TO PASS INFORMATION FROM A FIRST WEB-ENTITY TO ONE OF A PLURALITY OF SECOND WEB-ENTITIES

BACKGROUND OF THE INVENTION

The invention relates to a method of using a web-browser to pass information from a first web-entity to one of a plurality of second web-entities.

One problem with existing communications networks is that they are complex and have a disjointed architecture. For example, there is a lack of converged network management functions, and security schemas are often incomplete, inconsistent and/or redundant. It is therefore desired to produce a high performance network architecture which gives convergence, is highly scalable and which enables network rather than nodal services to be provided.

The term "web-entity" is used to refer to any apparatus, device or communications node which is accessible using a web-browser and which is connected to or in communication with a web-based communications network. For example, the web-entity may be a web-based information system, or a telephone terminal connected to the internet.

The term "web-based information system", is used to refer to a web site, web pages, or web-based application which enables a user to access stored information. For example, the web-based information system can be a list of telephone numbers on a web page or can be a sophisticated web-based interface to a database. Web-based information systems such as telephone directories, television programme schedules, movie guide databases, weather information databases and the like are well known. However, when a user obtains information from such a web-based information system this is usually being obtained for a task which then needs to be completed by the user. Often this task involves sending the information onto another device. For example, in the case that the web-based information system is a telephone directory, the task is typically to obtain a person's telephone number and then to make a call to that person. In the case that the web-based information system is a television programme schedule, the task could be to obtain the broadcast time details for a particular show and to then enter these details into a video recorder in order to make a video recording of the show.

It is desired to simplify these tasks and automate them as far as possible. For example, instead of a user obtaining a telephone number from a web-based directory, and then manually dialing the number, it is required to automate this process. This can be thought of as a "click to dial" service, where a user selects a telephone number from the directory and then clicks a button in order to send that number directly to a telephone, or other suitable communications network node, for dialing. It is particularly difficult to automate this type of process where there are many available telephones and telephone systems (for example) and it is necessary to send a telephone number to a specific one of these from one of several web-based information systems. More generally, it is required to enable a web-based information system to forward information to another device which is connected to the web, such as a video recorder or a private branch exchange (PBX), under the control of a web-browser. Previously, this has been addressed by providing advance details of the device to the web-based information system. For example, in order for the web-based information system to send information to a video recorder that is connected to the web, the web-based information system needs to know the location or address (more specifically a web address) of the video recorder. However, if it is required to provide a web-based service whereby users access a television programme schedule and send details to their video recorder, it is not practical for the web-based service to know details of all potential user's video recorders. The present invention seeks to address this problem by providing a method whereby a web-based information system is able to send information to a device without having prior knowledge about that device.

Three methods which involve the web-based information system having knowledge of the information receiver (e.g. video recorder, private branch exchange) are now described with reference to FIGS. 1 to 2.

The first method is described with reference to FIG. 1. FIG. 1 shows a client computer 10 which is in communication with a web-based information system 14 (or any other suitable web-entity) via the internet 12. The user of the client computer 10 has access to one telephone terminal 5. One or more other telephone terminals 20 are present for use by other client computers which are not shown. The user's telephone terminal 5 is associated with the client computer 10 and the web server 15 using a registration process i.e. the user must first register his telephone terminal 5 and his client computer with the web server 15. The user's telephone terminal 5 is connected to a private branch exchange (PBX) 18 and from there to a public switched telephone network 19. The PBX 18 is also connected to a web server 15 for example, using a CTI link. The web server 15 is connected to the internet 12. Consider the case where the web-based information system 14 is a telephone directory. Associated with each entry in the telephone directory is a (universal resource locator) URL for the web server 15 that is connected to the user's PBX 18. When the user of the client PC 10 accesses the web-based information service 14 and downloads for example a web page or another type of document with web links or an applet, he or she is able to select an entry in the web page telephone directory and cause the listed telephone number to be sent to the web server 15 as part of a corresponding URL and thus to the user's PBX 18. This enables the PBX to make the telephone call from the user's telephone terminal 5 to the selected telephone number. However, this approach has several drawbacks. For example, the URL of the web server 15 which is connected to the user's PBX 18 must be known by the web-based information service. Also, when other user's of a different PBX are considered the system is not really practical. For example, consider the user of a second client computer 11 whose telephone is connected to a different PBX 17 via a different web server 16. Because the web-based information service is arranged to forward telephone numbers to the other web server 15 it is not possible for a user of client pc 11 to select a telephone number and automatically initiate a call from his or her own telephone. In order to allow that to happen, several versions of the web-based information service would need to be provided, one for each PBX. This would be expensive and take up larger amounts of storage space. In addition, each user would need to know how to access the appropriate version of the web-based information service. A major drawback of this arrangement is thus that the web-based information service has knowledge about the web servers 15, 16 which are connected to PBXs 18, 17.

A second method can also be considered with respect to FIG. 1. Here the web-based information service maintains a database containing information about registered users and an associated PBX (or video recorder or other device) for each user. This avoids the need for several versions of the web-based information service to be provided, but still requires that the web-based information service has knowledge of the PBX, video recorder, or other information receiving device, for each user. In order to obtain this knowledge, each user is required to complete a registration process in which the information about the location of the information receiving device is provided to each web-based information service which they wish to use. However, this is time consuming for the user. Also, the web-based information service is required to maintain a complex database of the registration information and dynamically generate the appropriate web pages/information depending on which user is connected to the system. All of this is computationally expensive and very complex to implement, set up and maintain.

A third method is now considered with respect to FIG. 2. Nortel Networks' own Internet Voice Button product enables customers who visit a business web site to click a button on a web page in order to call the business, for example, to place an Hi order, request a service or ask for more information. As illustrated in FIG. 2, a customer computer 25 is connected to the internet 29. A business computer 26 is also connected to the internet 29. Telephone terminals 27, 28 are connected to each other via a public switched telephone network (PSTN) 30. A business web site is provided using a web server 32 connected to the internet 29 and a voice button server 31 is also provided connected to both the internet 29 and the PSTN 30. When a customer clicks on a voice button on a web page of the web site, information is sent to the voice button server 31. This information includes the business telephone number to be called as well as customer preference information. The customer preference information is entered by the user in a registration type process when the customer uses voice button for the first time. The customer preference information includes the telephone number of the customer's telephone set or telephone terminal 27. The voice button server 31 then initiates a call to the customer terminal 27. when the customer answers this call, the voice button server 31 initiates a second call to the business terminal 28. The two calls may also be initiated the other way around or simultaneously. The web site provided on the web server 32 may be a web-based information service such as a telephone directory. However, such a web-based information service has the same limitations as for the first method described above since the web-based information (on the web server 32) must point at (i.e. connect to and therefore know about) the voice button server 31. Therefore provisioning of multiple web-based information services (e.g. directories) and multiple voice button servers independently of each other is not possible and at best requires very complex implementations (somewhat akin to method two described above). Another drawback of this approach is that the call to the business telephone 28 is made from the voice button server 31 rather than the customer telephone 27. This means that the business has no information about the customer telephone 27 which requested the call. Because the method effectively involves joining or conferencing together the customer's telephone 27 and the business telephone 28 this call actually involves making two calls and has an inefficient loop through the voice button server 31 as compared with making a direct call from the customer to the business. This is often referred to as a "tromboning effect".

A fourth method is now described, with reference to FIG. 1b. In this case, a web-browser provided on a client computer 10 is set up with a special "plug in"/or in-built capability which enables the web-browser to recognise and support a special URL tag. Consider the situation where a web-based information service 14 provides a telephone directory. When a user selects an entry from the telephone directory, the corresponding telephone number is sent from the telephone directory web page to the user's computer 10 using the special URL tag. This URL tag is recognised by the specially configured web-browser at the client computer as containing a telephone number to be passed to a telephone (previously associated with the client computer using a standard CTI link or software telephone connection 30) for calling. The main drawback with this method is that each user's web-browser needs to be specially configured to recognise and support the particular URL tags. Microsoft (trade mark) have introduced the proprietary URL tag CALLTO which automatically initiates a call using the telephone number which follows the URL tag. Microsoft's NetMeeting (trade mark) software is used to do this. The user's web-browser needs to be equipped with a helper application to pick-up the special URL tag and pass it to the appropriate application or device using a suitable protocol or interface. For example, CALLTO passes the information (phone number) to Microsoft NetMeeting (trade mark) which then places the call. Thus in this fourth method the web-based information service does not require information about the user's telephone. However, each user must use a special web-browser as described above and needs either a helper software telephone application (like Netmeeting (trade mark) or a standard CTI link 30. Thus it can be seen that even if the market reaches the stage where the required URL tag and the special browser capability becomes standard and widely available this approach doe not resolve to requirement to have a fully thin-client (i.e. a web browser only) solution.

It is accordingly an object of the present invention to provide a method of using a web-browser to pass information from a first web-entity to one of a plurality of second web-entities which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of using a web-browser to pass information from a first web-entity to one of a plurality of second web-entities, said method comprising the steps of:— receiving a pre-specified address of a redirection server, together with additional information, from the first web-entity at the web-browser;

forwarding an address of the second web-entity to the redirection server from the web-browser such that the redirection server redirects the web-browser to the second web-entity and passing the additional information from the web-browser to the second web-entity.

This provides the advantage that information from a first web-entity is passed to a second web-entity under the control of a web-browser. For example, the first web-entity may be a web-based information system such as a telephone directory or television programme schedule database. The second web-entity is an information receiver such as a web-server that is connected to a PBX, or a video recorder or telephone terminal.

Advantageously, separation (i.e. independent provisioning) of the various entities in the solution is provided.

Advantageously, the method involves using a standard web capability to pass information between two unrelated web entities (such as a web-based information system and an information receiver) under the control of a web-browser. Typically a web-browser is used to receive information from one or more web sites. In contrast, the present invention involves using a web-browser simply to control the passing of information.

According to another aspect of the present invention there is provided a web-based information system arranged to provide items of information, said web-based information system comprising:—
- an input arranged to receive instructions from a web-browser such that an item of information from the database may be accessed and selected;
- an output arranged to forward a pre-specified address of a redirection server together with an item of information accessed from the database to the web-browser.

This provides the advantage that a web-based information system, such as a telephone directory service, is provided where a user is able to use a web browser to select an item from the directory. The web-based information system then sends a pre-specified address to the web-browser in order that the web-browser may be redirected, for example, to a PBX for setting up a telephone call to the number selected from the directory.

According to another aspect of the present invention there is provided a method of operation of a web-based information system which is arranged to provide items of information said method comprising the steps of:—
- receiving instructions from a web-browser such that an item of information from the database is accessed and selected;
- forwarding a pre-specified address of a redirection server together with the accessed, selected item of information to the web-browser.

According to another aspect of the present invention there is provided a web server for redirecting a web-browser said web server comprising:
- an input arranged to receive from the web-browser an address of a web-entity together with additional information; and
- a processor arranged to redirect the web-browser to the web-entity such that in use the web-browser may send the additional information to the web-entity.

The web-server, for example, a redirection server as described herein, is advantageous because it enables a web-browser to be redirected in order that information may be passed between two web-entities. No prior or subsequent association between the web entities is required.

According to another aspect of the present invention there is provided a computer program for controlling a web server in order to redirect a web-browser, said computer program being arranged to control the web server such that:—
- an address of a web-entity is received from the web-browser together with additional information; and
- a processor redirects the web-browser to the web-entity such that in use, the web-browser may send the additional information to the web-entity.

According to another aspect of the present invention there is provided a method of using a web-browser to generate cookies for each of an information receiver, and a redirection server, said method comprising the steps of:—
- accessing the information receiver using the web-browser; and
- automatically redirecting the web-browser to the redirection server.

This provides the advantage that a user is not required to separately access the information receiver and redirection servers separately, in two different actions. Instead the user's web browser is automatically redirected to the redirection server. This saves time and effort for the user and ensures that cookies are generated correctly and for each required entity.

Advantageously, the method involves using a standard web capability to pass information between two unrelated web entities (such as a web-based information system and an information receiver) under the control of a web-browser. Typically a web-browser is used to receive information from one or more web sites. In contrast, the present invention involves using a web-browser simply to control the passing of information.

DETAILED DESCRIPTION OF THE EMBODIMENTS

Embodiments of the present invention are described below by way of example only. These examples represent the best ways of putting the invention into practice that are currently known to the Applicant although they are not the only ways in which this could be achieved.

Figure 6:
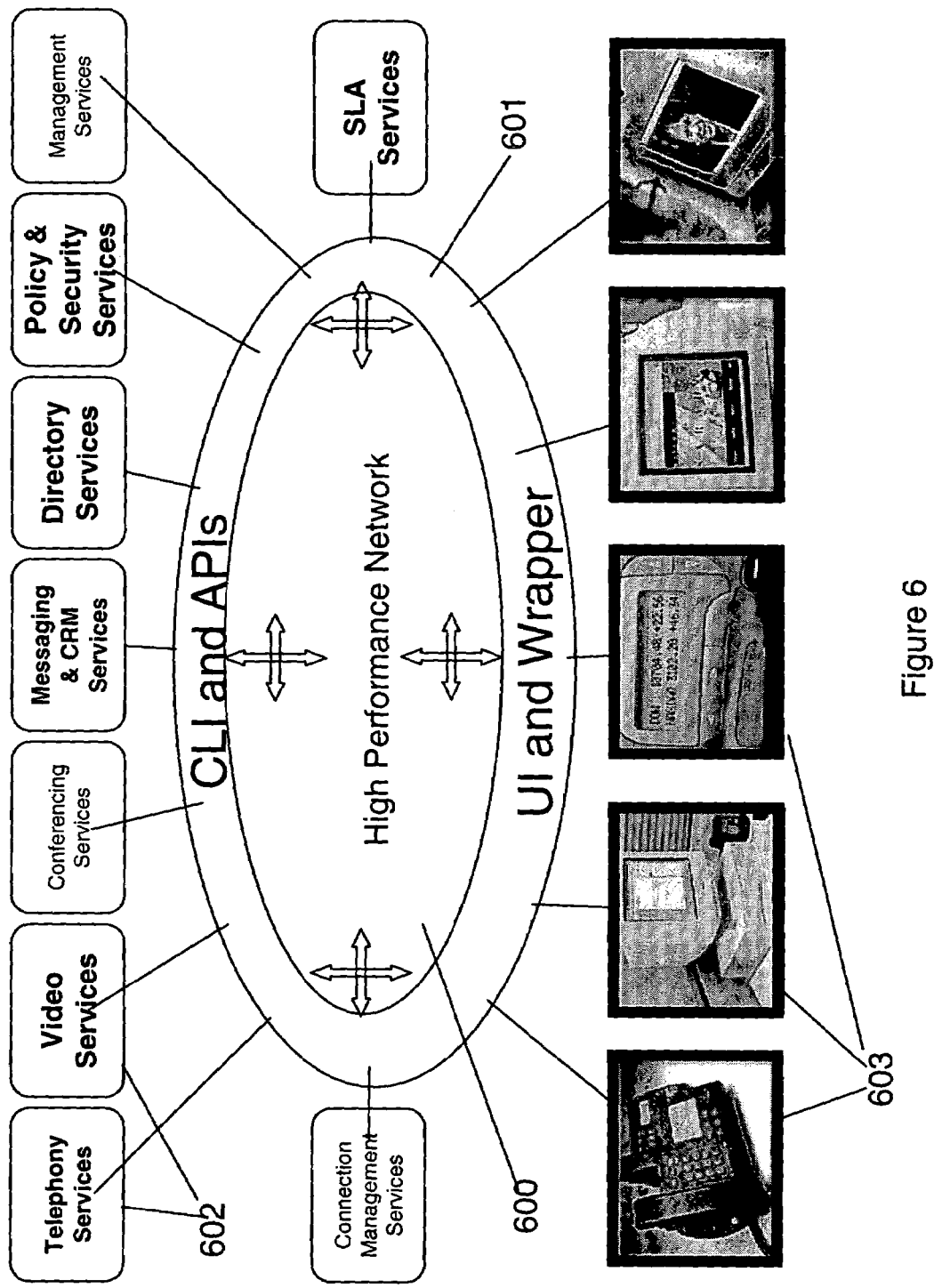
FIG. 6 is a schematic diagram of a high performance network architecture.

FIG. 6 is a schematic diagram of a high performance network architecture which it is desired to produce. A central high performance network (HPA) 600 is shown which is surrounded by an interface layer 601. The interface layer 601 enables the HPA 600 to be used for different service types 602 (such as telephony services, video services, conferencing services and messaging services) as well as enabling services such as directory services and service level agreement (SLA) services to be provided over the whole network rather than nodally. In addition, the interface layer 601 enables many different types of terminal 603 to access the HPA. The present invention provides part of such an interface layer 601 or "wrapper" by enabling information provided using a web-based information system to be sent to any information receiver that is in communication with the network. This is achieved without the need for the web-based information system to know the location of the information receiver.

In the present invention an additional web server is used to receive information from the web-based information system and redirect this information to a required information receiver (such as the user's telephone, video recorder, or other device). In this way the web-based information system does not require knowledge about the information receiver and it is not required to use a special web-browser.

The additional web server is referred to herein as a "well-known redirection server" in order to distinguish it from the web server of the web-based information system. The term "information receiver" is used to refer to the device, apparatus or processor to which it is required to send information from the web-based information service. For example, this information receiver may be a video recorder, a telephone terminal, a private branch exchange or other switch or any other suitable device.

It is possible for the well-known redirection server to be integral with or part of the web-based information system. However, in a preferred embodiment one re-direction server and a plurality of web based information systems are used.

The information receiver is connected to the web, able to receive a URL and arranged to give at least a standard null response on receipt of a URL. In this way the information receiver is a limited type of web server. However, it is not essential for the information receiver to perform conventional web server functions such as serving web pages.

The term "cookie" is used to refer to temporary information that is written from a web-server to a computer on which a connected web-browser is provided. For example, during browsing of a particular web-site, cookie information about the fact that that site has been accessed may be stored in a cookie on the user's computer. Typically, when a user operates the web-browser to request access to the same web-server again, any associated cookie information is forwarded to the web site together with the request for access.

Figure 3:
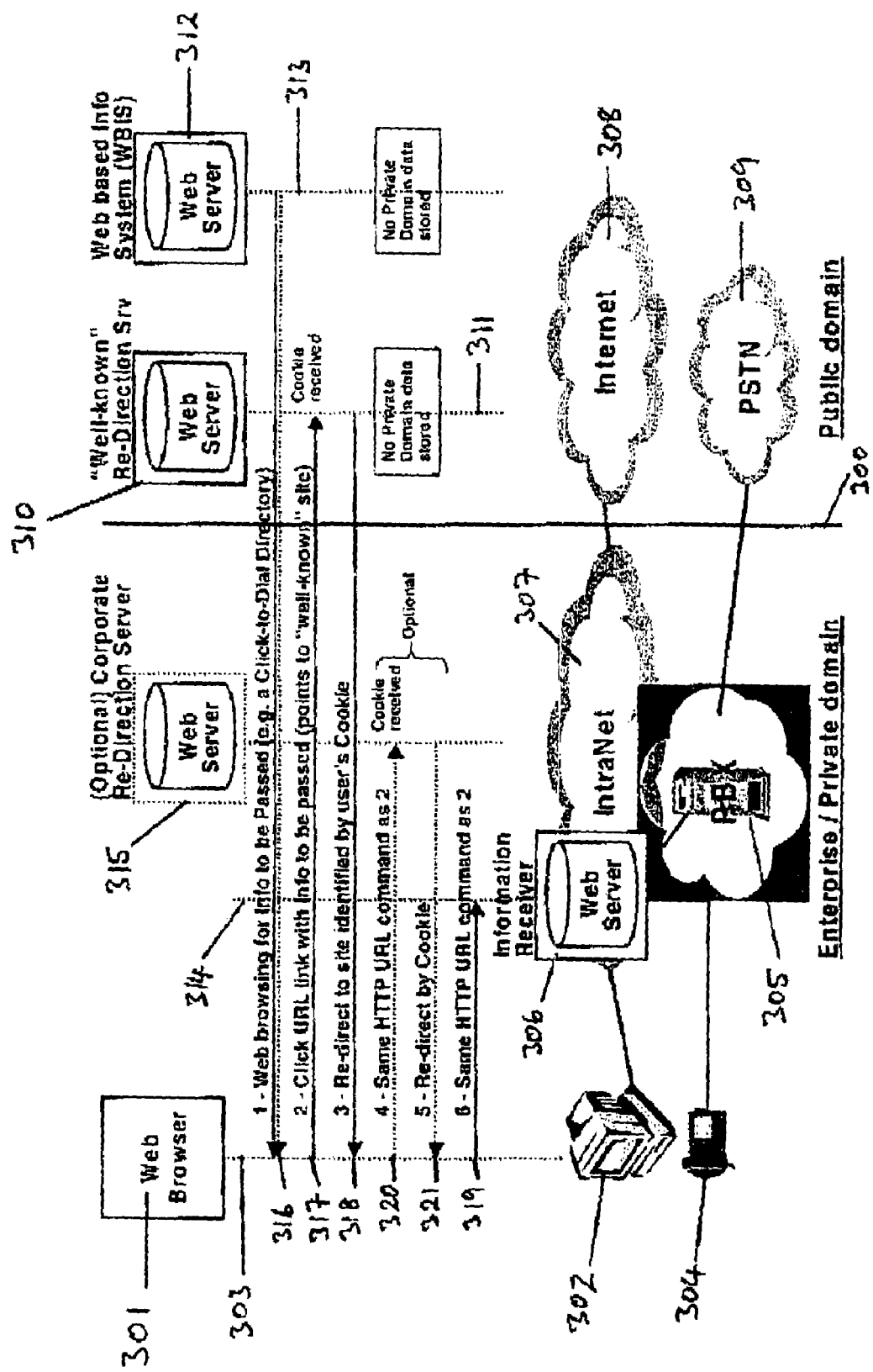
FIG. 3 is a message sequence chart showing a method of accessing information from a web-based information system and forwarding this to an information receiver.

In the message sequence chart of FIG. 3 vertical lines are used to indicate entities between which messages are passed, except for a bold vertical line 300 which is used to divide items on the right hand side which indicate public domain items, from those on the left which are private domain items such as those employed by a company or enterprise. A web-browser 301 provided on a user's computer 302 is represented by vertical dotted line 303. The user has an associated telephone terminal 304 which is connected to the enterprise's private branch exchange (PBX) 305. The PBX is connected to and controllable by a web server 306 which is referred to as the information receiver 306. This information receiver is itself part of an intranet 307 specific to the enterprise. The user's computer 302 is also connected to this intranet 307.

The intranet 307 of the enterprise is connected to a public internet 308, for example, via a firewall and in a similar way, the PBX 305 of the enterprise is connected to a public switched telephone network 309. A well known redirection server 310 is provided as part of the public internet 308 and represented by vertical dotted line 311. Also, a web server is provided for the web-based information system 312 and this is represented by dotted vertical line 313. The web-based information system 312 is also part of the public internet 308.

The information receiver 306 is represented by vertical dotted line 314. An optional corporate redirection server 315 is illustrated. However, an embodiment of the invention is first discussed which does not use such a corporate redirection server 315 and in which steps 4 and 5 in the message sequence chart do not take place.

For reasons of clarity, FIG. 3 illustrates only one enterprise which uses the web-based information system although other enterprises may also use the same web-based information system in the same manner. In that case, there are a plurality of information receivers 306 and when information is sent from the web-based information system 312 it must be sent to the correct information receiver.

A method of accessing information from a web-based information system 312 and forwarding this to the correct information receiver 306 is now described with reference to FIG. 3 and using the example that the web-based information system provides a telephone directory. It is also assumed that a user of computer 302 has previously used the web-browser 301 to access the well-known redirection server 310 and that a cookie has been stored on the computer 302 indicating this. This cookie contains an address (e.g. a URL) for the information receiver 306 that is associated with the user's computer 302.

The user of computer 302 first accesses the web-based information system 312 using the web-browser 301 and information from the web-based information system 312 is presented on the user's computer. This is indicated by step 1 in FIG. 3 and arrow 316 which indicates the flow of information from the web-based information system 312 to the web-browser 301. The user then clicks on an item to select an entry in the telephone directory for say, Joe Bloggs, in order to telephone Joe Bloggs. Each entry in the telephone directory has previously been set up to have an associated HTTP URL address with the telephone number for that entry contained as a parameter of the HTTP URL address (URL is sometimes also called URI (universal resource indicator)). The specific HTTP URL address used is that for the well-known redirection server 310. As a result of clicking on the Joe Bloggs entry, the URL containing Joe Bloggs' telephone number is sent from the web-browser to the well-known redirection server 310. At the same time the cookie containing the URL of the information receiver 306 is sent from the user's computer 302 to the well-known redirection server 310 as an HTTP command together with the URL containing Joe Bloggs' telephone number. This is indicated by step 2, arrow 317 in FIG. 3.

When the well-known redirection server 310 receives the HTTP command, it redirects the web-browser 301 to the location identified by the cookie, which is the particular information receiver 306 associated with the user's computer 302. This is indicated by step 3, arrow 318 in FIG. 3.

As a result of redirecting the web-browser 301 to the information receiver 306, the web browser 301 resends the HTTP command containing Joe Bloggs' telephone number to the information receiver 306. This is indicated by step 6, arrow 319 in FIG. 3. When the information receiver 306 obtains Joe Bloggs' telephone number it is then able to initiate a call to Joe Bloggs.

In another embodiment, a corporate redirection server 315 is used in addition to the well known redirection server 310, as illustrated in FIG. 3. In this case, two cookies are stored on the user's computer 302. One which contains the address of the information receiver 306 and one which contains the address of the corporate redirection server.

During step 2 of the method (arrow 317 in FIG. 3) the cookie sent to the well-known redirection server 310 is that containing the address of the corporate redirection server 315. This means that during step 3 of the method the web-browser 301 is redirected to the corporate redirection server 315 instead of directly to the information receiver.

Step 4 of FIG. 3 then takes place (arrow 320) and this involves the web-browser 301 sending the same HTTP URL command as in step 2 to the corporate redirection server 315. Together with this HTTP command the second cookie is sent which contains the address of the information receiver. This causes the corporate redirection server 315 to redirect to the information receiver 306 (see step 5, arrow 321 of FIG. 3). Step 6 (arrow 319) then involves sending the HTTP command to the information receiver which is then able to obtain Joe Bloggs' telephone number from this HTTP command.

By using a corporate redirection server 315 in this way management of the system is improved for information passing within the enterprise domain (represented on the left hand side of line 300 in FIG. 3). This management improvement is as a result of all requests for information receivers coming through a single corporate redirection server 315 which effectively manages which information receivers are used by the users. Thus it is possible to automatically reassign users to different information receivers, for example for load sharing or the introduction of a new service. This is particularly applicable in large, multi-national enterprises where there may be a significant plurality of information receivers. This benefit needs to be balanced against the additional delay incurred in going through two redirection servers.

Another way in which the corporate redirection server may be used is for example for internal directories which would never be made available outside the company's intranet 307. Such an internal web-based information system (like 312 only on the other side of line 300) is configured to point directly to the corporate redirection server 315 instead of to the well known redirection server 310. From there the HTTP URL command is redirected directly to the user's information receiver 306. The primary benefit of such an approach is a performance improvement due to all information exchanges being within the intranet 307 and also the fact that it obviates the need for users of the service to have public internet 308 access.

As described above it is assumed that the user of computer 302 has previously used the web-browser 301 to access the well-known redirection server 310 and that a cookie has been stored on the computer 302 indicating this. This cookie contains an address (e.g. a URL) for the information receiver 306 that is associated with the user's computer 302. Creation of the cookie may be achieved by requesting the user to access the well-known redirection server and then obtaining information from the user about the address of the appropriate information receiver 306 for that particular user. This information is not stored by the well-known redirection server 310 but is simply used to form the cookie that is sent to and stored on the user's computer 302. Thus the well-known redirection server 310 does not store information about the information receiver 305. Neither does the web-based information system 312 store or access information about the information receiver 305. As shown in FIG. 3, neither the well-known redirection server 310 nor the web-based information system 312 store data about private domain entities, (those on the right hand side of line 300 in FIG. 3).

As mentioned above, in some embodiments, more than one redirection server is used and a cookie is needed for each redirection server. These cookies are obtained during previous web access of the appropriate redirection server as described above. In addition, in order for the information receiver 306 to act appropriately on the information which is passed to it in the HTTP URL command, a cookie may also be required from the information receiver containing information about the user's service as provided by the information receiver 306. For example this information could specify which telephone set 304 to make the call from when a specific web browser 301 is used to send a dialing command to the information receiver 306 via the various redirection servers 310, 315. In order to simplify the process of creating and storing these cookies, an automatic redirection process may be used as now described with reference to FIG. 4.

Figure 4:
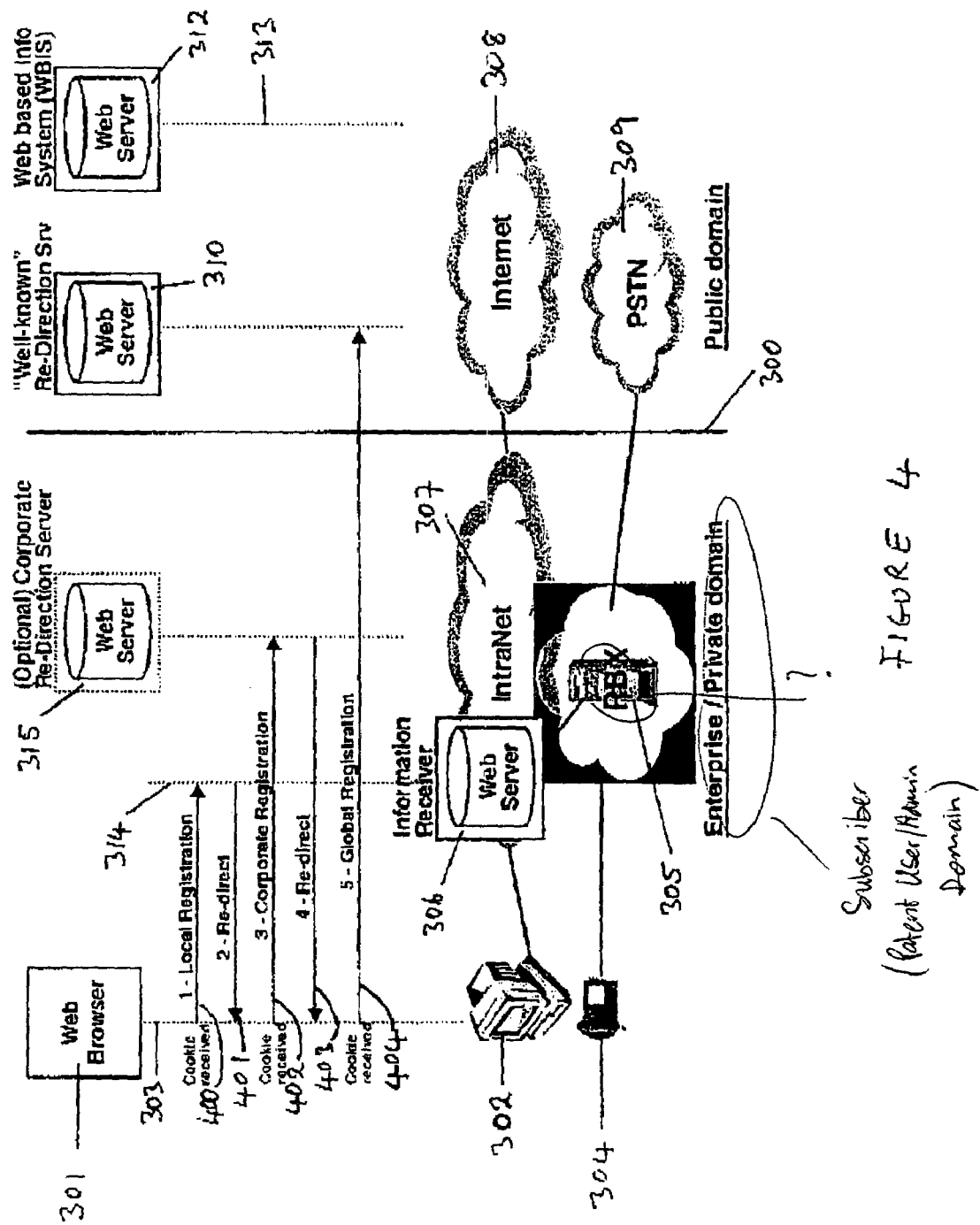
FIG. 4 is a message sequence chart showing a method of automatically creating cookies for an information receiver, a corporate redirection server and a well-known redirection server.

A user first operates the web-browser 301 to access the information receiver and a cookie is generated and sent to the web-browser (see arrow 400 in FIG. 4). The information receiver then automatically redirects the web-browser 301 to the corporate redirection server 315 (see arrow 401 of FIG. 4) by using the standard web server redirection methods which are part of the HTTP protocol as is known in the art. This process then repeats as indicated by arrows 402, 403 and 404 in FIG. 4 such that cookies are generated for the corporate redirection server 315, and the well-known redirection server 310.

Figure 1:
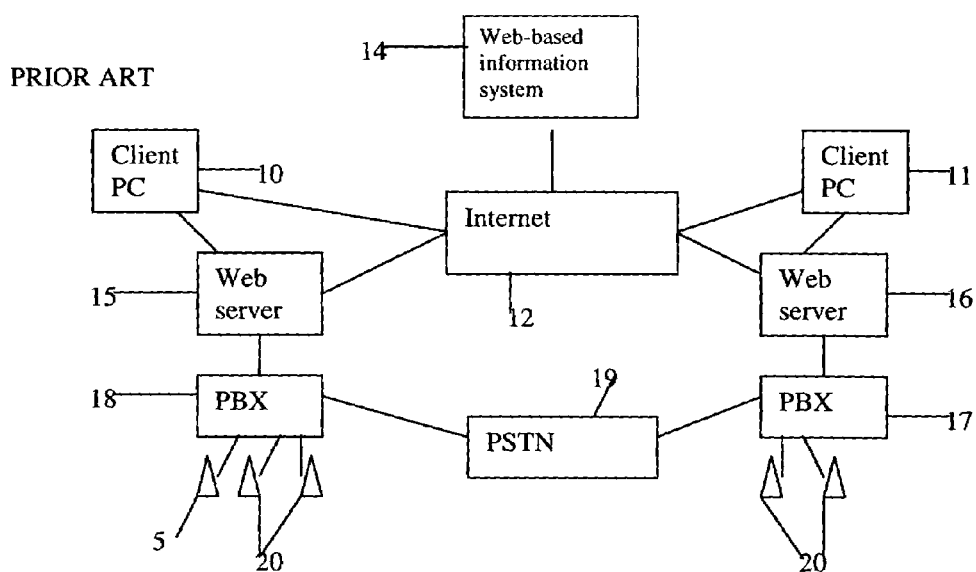
FIG. 1 is a schematic diagram of a web-based information system connected to the internet showing web servers connected to the internet and also to private branch exchanges (PBXs).
Figure 1B:
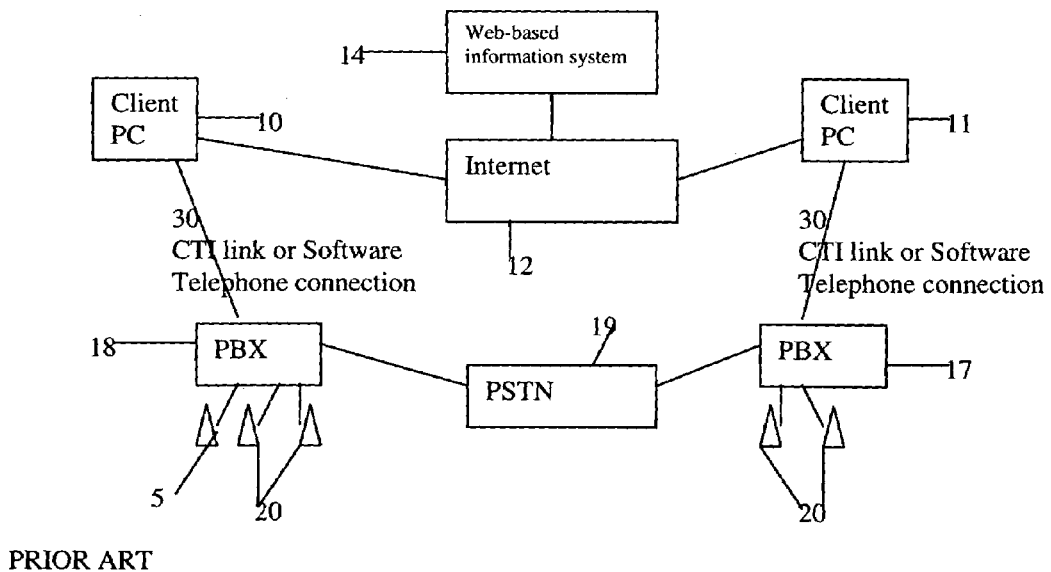
FIG. 1*b* is a schematic diagram of a web-based information system connected to the internet showing user PCs connected to the internet and also to private branch exchanges (PBXs).
Figure 2:
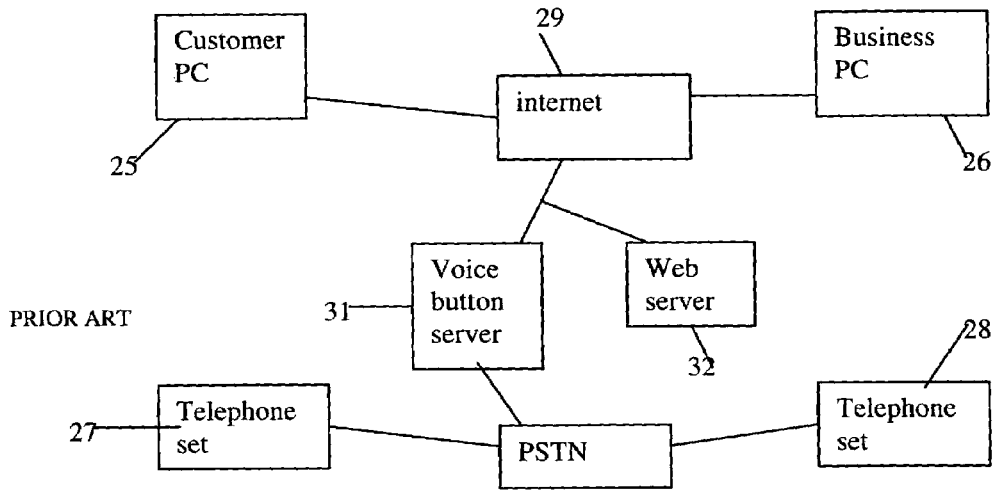
FIG. 2 is a schematic diagram of a voice button server in communication with customer and business telephone and computer terminals.
Figure 5:
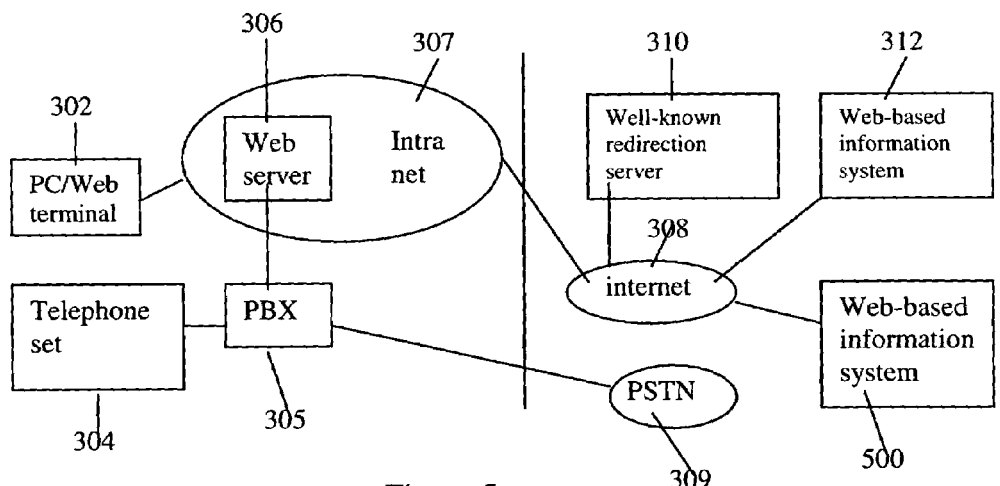
FIG. 5 is a schematic diagram showing two web-based information systems which make use of a single redirection server.

FIG. 5 illustrates how use of the well-known redirection server 310 may be extended for more than one web-based information system. FIG. 5 is the same as the part of FIG. 3 which shows the entities between which messages are sent, except that a second web-based information system 500 is shown. This provides at least some of the same type of information as the first web-based information system 312. For example, the two web-based information systems may be provided by different service providers. The second web-based information system also provides a web page which contains links to the well-known redirection server 310 in order to use the method of the present invention.

The present invention also covers a plurality of information receivers 306, whether within the same intranet 307 or whether part of a plurality of separate intranets or part of the public internet 308. The preferred embodiment of the invention has shown web browsers 301, information receivers 306, PBXs 305 and (optional) corporate redirection servers 315 deployed within an intranet 307. However, the methods of the present invention may be equally well used where these entities are deployed in the public domain, for example by a public (central office) exchange carrier, an internet service provider (ISP) or an application service provider (ASP).

The examples described above, which involve dialing a telephone number automatically are also applicable to situations in which a telephone call is transferred or conferenced automatically. That is, the methods can be used to enable a user to select an item from a web based information service and in so doing automatically transfer or conference a call to a particular web entity.

A range of applications are within the scope of the invention. These include situations in which it is required to pass information from a first web entity such as a web-based information service to a second web entity such as a device, application or other information receiver. In the example described above the web-based information service 312 provides a telephone directory service and the information receiver is a PBX 305. However, this is not essential; any suitable type of web-based information service may be used. For example, a television programme schedule, weather information service, or other service. In the case that a television programme schedule is provided, the information receiver may be a video recorder. In step 2 of the method, the URL would contain details of a selected television programme instead of a telephone number. This information is then eventually passed to a video recorder associated with the user's computer 302 in order that the video recorder may be automatically programmed to record the specified show. In the case that a weather information service is provided, information about the predicted outside temperature may be passed using the method to a home heating control system which is then able to automatically adjust itself to take into account the weather forecast. Many other such applications are possible. As described above the methods can be used with a Voice Button (call-me/click-to-talk) scenario and also in a public switch (as well as a PBX) environment.

The invention claimed is:

1. A method of using a web-browser to pass information from one of a plurality of first web entities to a second web entity said web-browser being separate from said first and second web-entities and said one of a plurality of first web entities having no information about the second web entity, said method comprising the steps of:—
   (i) receiving a pre-specified address of a redirection server, together with additional information, from the one of a plurality of first web entities at the web-browser;
   (ii) forwarding an address of the second web-entity to the redirection server from the web-browser such that the redirection server redirects the web-browser to the second web-entity and
   (iii) passing the additional information from the web-browser to the second web-entity.

2. A method as claimed in claim 1 wherein the one of a plurality of first web entities is a web-based information system.

3. A method as claimed in claim 1 wherein the second web-entity is an information receiver.

4. A method as claimed in claim 1 wherein said step (ii) comprises forwarding the additional information to the redirection server together with the address of the second web-entity.

5. A method as claimed in claim 1 wherein the additional information comprises a telephone number and the second web-entity comprises a node in a telecommunications network.

6. A method as claimed in claim 1 wherein the additional information comprises television programme information and wherein the second web-entity comprises a video recorder.

7. A method as claimed in claim 1 wherein the address of the second web-entity is forwarded to the redirection server in a cookie from the web-browser.

8. A method as claimed in claim 1 wherein said additional information comprises instructions for an action to be performed at the second web entity.

9. A web-based information system arranged to provide items of information for receipt by an information receiver, said web-based information system comprising a communications network interface and a processor configured to:—
   (i) receive from a web-browser via the communications network interface an instruction to access and select an item of information from a database; said web-browser being separate from said web-based information system and said information receiver;
   (ii) forward via the communications network interface a pre-specified address of a redirection server together with an item of information accessed from the database to the web-browser; said web-based information system having no information about the information receiver.

10. A web-based information system as claimed in claim 9 wherein said database of items comprises telephone numbers.

11. A method of operating a web-based information system which is arranged to provide items of information for receipt by an information receiver said method comprising the steps of:—
   (i) receiving from a web-browser via a communications network interface an instruction to access and select an item of information from a database; said web-browser being separate from said web-based information system and said information receiver;
   (ii) forwarding to the web-browser via the communications network interface a pre-specified address of a redirection server together with the accessed, selected item of information; said web-based information system having no information about the information receiver.

12. A communications network comprising a web-based information system as claimed in claim 9 and at least one redirection server.

13. A web server for redirecting a web-browser said web server comprising a communications network interface and a processor configured to:
   (i) receive from the web-browser via a communications network interface an address of a web-entity together with additional information said additional information having been obtained from a web-based information system which has no information about the web-entity; said web-browser being separate from the web-server, the web-entity and the web-based information system; and
   (ii) redirect the web-browser to the web-entity such that in use the web-browser may send the additional information to the web-entity.

14. A web server as claimed in claim 13 wherein said processor is arranged to receive a cookie from the web-browser via the communications network interface, said cookie containing the address of the web-entity.

15. A web server as claimed in claim 13 wherein the web entity is itself a web server for redirecting a web-browser.

16. A method of using a web-browser to generate cookies for each of an information receiver, and a redirection server, said method comprising the steps of:—
   (i) accessing the information receiver using the web-browser; and
   (ii) automatically redirecting the web-browser to the redirection server.

17. A method as claimed in claim 16 which further comprises repeating said step (ii) of automatically redirecting for one or more additional redirection servers.

* * * * *

UNITED STATES PATENT AND TRADEMARK OFFICE
CERTIFICATE OF CORRECTION

PATENT NO.       : 7,613,824 B1                       Page 1 of 1
APPLICATION NO. : 09/707015
DATED            : November 3, 2009
INVENTOR(S)      : Elberse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2215 days.

Signed and Sealed this

Nineteenth Day of October, 2010

David J. Kappos
*Director of the United States Patent and Trademark Office*